Jan. 7, 1969  D. H. BERRIER  3,419,985
DISTANCE SAFETY STICKER
Filed April 8, 1966
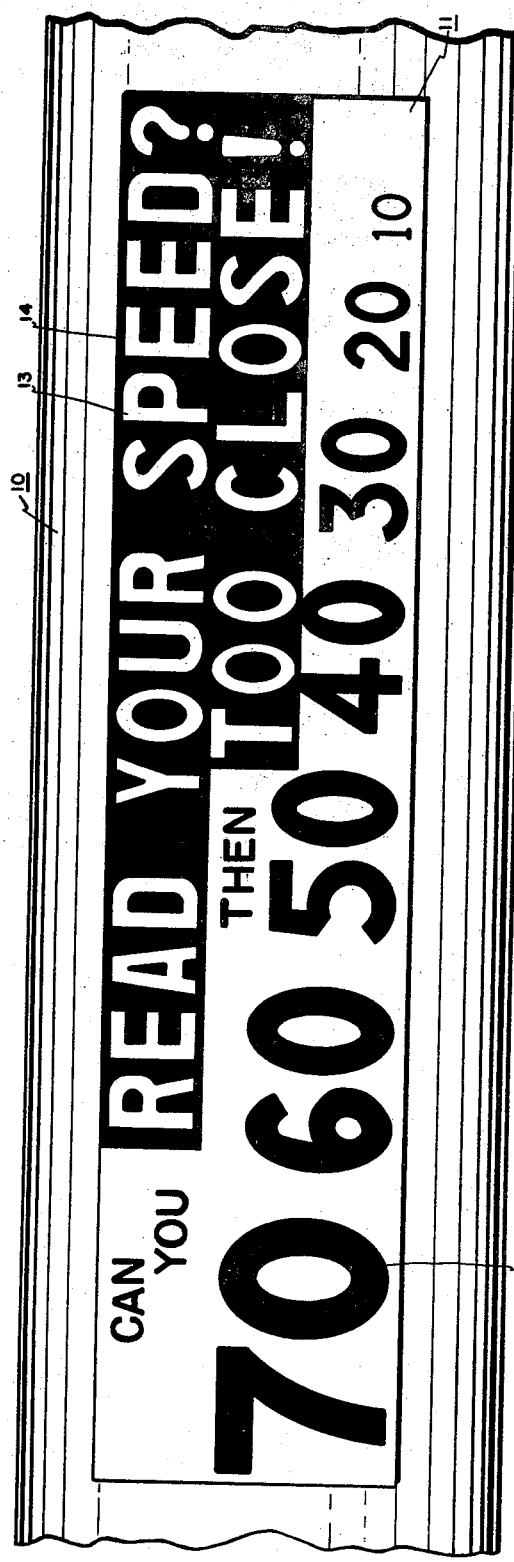
INVENTOR.
DUANE H. BERRIER
BY M. Ralph Shaffer
HIS ATTORNEY United States Patent Office 3,419,985
Patented Jan. 7, 1969

3,419,985
DISTANCE SAFETY STICKER
Duane H. Berrier, 851 Talisman Drive,
Salt Lake City, Utah 84116
Filed Apr. 8, 1966, Ser. No. 541,266
U.S. Cl. 40—129       7 Claims
Int. Cl. G09f 7/00; G09f 21/00

ABSTRACT OF THE DISCLOSURE

The present invention presents a placard, sticker, sign or the like readily attachable to the rear bumper of a vehicle. The sign bears numeral, speed-indicating indicia which are graduated as to size. These numeral, speed-indicating indicia are designed such that when the driver of a following vehicle and having normal eyesight can read the speed-designation of the speed he is driving, he will known that he is at or closer than a minimum, safe stopping distance behind the vehicle bearing the sticker.

In a preferred form of the invention there is implaced on the sticker a certain message, in combination with the physical characteristics of the sign and the numeral speed indicia placed thereon, so as to convey the rear driver the information that if he can read the speed at which he is traveling, then he is traveling too close to the first vehicle for safe stopping.

---

The present invention relates to placards, signs, stickers and the like and, more particularly, to a new and useful distance safety sticker for attachment to the rear of automobiles and other vehicles, preferably on the rear bumper thereof.

Many accidents, both in the cities and on the highways, are caused by vehicles following another too closely. If a forward vehicle makes a sudden deceleration, then the vehicle next behind will almost certainly collide with the decelerating vehicle, swerve out of control, or otherwise create a dangerous menace on the highways. This is especially true when drivers maintain a distance closer to the automobile traveling in front of them, than that recommended by the National Safety Council. This nationwide council maintains that a bare minimum distance automobiles should keep from the vehicles traveling in front of them will be one car length or approximately 20 feet for each ten miles per hour of speed. Thus, if two automobiles are traveling in line at a speed of 70 miles per hour, there should be a minimum distance of 140 feet (20×7) between the two vehicles.

The inventor has devised a means by the present invention of providing a visual indication to the driver of the following vehicles, indicating to him the point at which a minimum safe driving distance is being violated by him at the speed at which he is traveling. The invention takes cognizance of different driving speeds and different minimum distances to be maintained for safety purposes.

Accordingly, a principal object of the present invention is to provide a new and useful distance safety sticker for automobiles and other vehicles.

A further object of the invention is to provide a sign or sticker for disposition on a rearward part, preferably the bumper, of a vehicle so as to indicate to another vehicle following the same that for any given speed or approximate speed a particular distance should be maintained.

A further object of the invention is to provide a distance safety sticker for vehicles which incorporates speed indicia, such as printed numbers, such indicia being of a size so that a driver with normal (20–20) vision will just be able to discern his speed, noting the indicia on the sticker, at that point where he is commencing to reduce his traveling distance behind the forward vehicle below the minimum distance suggested by the National Safety Council, to wit, 20 feet of distance for each 10 miles of speed per hour.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

The sole figure is a fragmentary front elevation of the bumper of a vehicle incorporating on its surface the distance safety sticker of the present invention in a preferred embodiment thereof.

In the figure the bumper 10 of a vehicle is shown in fragmentary view and has included thereon the distance safety sticker 11 of the present invention. The sticker may be made of paper, vinyl, or other plastic and will be provided with a pressure-sensitive adhesive in the usual manner to accommodate the sticker actually sticking to the bumper. There are many existing placard or sticker materials and pressure-sensitive adhesives which are uniquely adapted for outdoor use and which will allow the sticker to be removed from the bumper, when desired, without the sticker tearing. Such forms no part of this invention.

Disposed upon the sticker 11, preferably in printed lettering or numbering, is a series of indicia 12 indicating possible speeds of vehicles immediately following the vehicle employing the sticker. Thus, in one embodiment there is provided a series of speed indicia spaced in 10 mile-per-hour increments from "70" miles per hour to "10" miles per hour. It will be noted that the height of the indicia as well as the line width thereof gradually reduces from "70" to "10." Opticians' eye charts generally maintain a 1:5 ratio between line width and letter or number height as being the most ideal for visual discrimination of indicia of various types. When such a height, line-width ratio is maintained, then the lettering or numbering can be perceived most clearly for any given distance. The question then is how to determine the height of the numbered speeds "70"–"10" on the sticker for particular minimum safe traveling distance. The National Safety Council advises that for each 10 miles per hour of speed a following vehicle should maintain one car length or approximately 20 feet of distance from the car in front. The inventor, an engineer, has consulted a representative standard chart and has determined that for 10 feet of distance, a letter or number will have to be .345 inch (or .0345 for every increasing mile per hour) high for a person of normal vision to just read same. Hence, the speed indication "10" should be .345 inch high, with the number height increasing .345 inch for each increase in speed of 10 miles per hour. Thus, the speed of 20 miles per hour, 30 miles per hour, and so on (40–70 miles per hour) will be .690 inch, 1.035 inches, 1.380 inches, 1.75 inches, 2.070 inches, on to 2.415 inches for the speed 70 miles per hour. These values correspond to progressive multiples, commencing at 1, of 20 feet through 140 feet distance (the latter for a 70-mile-per-hour speed). In operation, thus, a driver of normal 20–20 vision who is just able to read the "70" on the sticker will know that, because of his being able to just read the number, he is 7 car lengths or 140 feet behind the vehicle bearing the sticker. If it is too small for him to read, then the rear driver knows that, provided he has normal vision, he is at a safe distance behind the minimum safe distance prescribed by the National Safety Council for that speed.

For slower speeds such as 40 miles per hour, then if the rear driver can just read 40, he knows he is traveling at the minimum safe driving distance.

It is noted that there is also a warning message 13:

"CAN YOU READ YOUR SPEED? THEN TOO CLOSE." The phrase "READ YOUR SPEED?" is shown in "reverse printing." This is to say, the background is colored whereas the lettering can be the surface of the sticker itself. Direct printing, on the other hand, may be used for the speed designation. Here the message shown in the figure, i.e., message 13, is seen to be the color of the sticker itself, whereas the gackground 14 may be the same color, including black as a color, as that for the several speed indicia 12. Of course, the reverse situation could be the case wherein reverse printing could be used for the speed indication and direct printing for the warning code or message.

In either event, the cost of the sticker is substantially reduced through a one-color printing operation; yet, the message in having a different printing character can be easily discerned from the speed indication. Were the lettering and the numbering all of the same character, either direct or reverse printing, then there might tend to be some confusion for an instant reading of the sticker by a driver in a rearwardly-traveling vehicle.

For optimum results the message should be as large as the sticker permits, approaching the maximum speed indication on the sticker. The size of the speed indicia has been previously given and should not vary certainly over ±20% of the height measurements previously indicated. Close adherence to the height factors given will produce the best possible results.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A distance safety sticker including, in combination, a sheet securable to the rear of a vehicle, said sheet being provided with a graduated series of numerical indicia representing different vehicle speeds, the size of each indicia on the sticker bearing a relation with the minimum distance from which the indicia is first clearly visible by the operator a following vehicle, the size of each indicia establishing said minimum distance as a minimum safe driving distance for said following vehicle at the speed represented by each said indicia.

2. The structure of claim 1 wherein said numerical indicia are horizontally spaced and graduated in intervals of 10 miles per hour.

3. The structure of claim 1 wherein each of said numerical indicia is of the order of .0345 inch high for each one-mile-per-hour of speed said speed indicia designates.

4. The structure of claim 1 wherein each of said numerical indicia is of the order of .0345 inch high for each one-mile-per-hour of speed said numerical indicia designates, the line width of respective ones of said indicia being of the order of 1:5 with respect to the height of said respective ones of said indicia.

5. The structure of claim 1 wherein each of said numerical indicia is of the order of .0345 inch high, ±20% deivation, for each one-mile-per-hour of speed said speed indicia designates.

6. The structure of claim 1 wherein said sheet also includes a warning message calling attention to the driver of said following vehicle that if he can read his approximate speed among said indicia on said numerical speed sticker, then he is traveling too close to said vehicle for stopping.

7. The structure according to claim 6 wherein one of said message and said numerical indicia comprise direct printing, the remaining comprising reverse printing having a colored background, said direct printing and said background of said reverse printing being of one color.

References Cited

UNITED STATES PATENTS 759,229  5/1904  Bechtold _____ 40—132

OTHER REFERENCES

Popular Science, vol. 174, No. 4 (April 1959), p. 87.
Atherton, Electrical Advertising, 1925, pp. 119–120.
Hackleman, Commercial Engraving and Printing, 1921, p. 183.

EUGENE R. CAPOZIO, *Primary Examiner.*

W. W. NIELSEN, *Assistant Examiner.*